United States Patent [19]

Ng

[11] Patent Number: 4,835,551
[45] Date of Patent: May 30, 1989

[54] OPTICAL RECORDER WITH PLURAL RESOLUTION RECORDING

[75] Inventor: Yee S. Ng, Fairport, N.Y.

[73] Assignee: Eastman Kodak Company, Rochester, N.Y.

[21] Appl. No.: 140,195

[22] Filed: Dec. 31, 1987

[51] Int. Cl.$^4$ ............................................. G01D 9/42
[52] U.S. Cl. ...................................... 346/108; 358/296
[58] Field of Search ................ 346/108, 160; 358/296.

[56] References Cited

U.S. PATENT DOCUMENTS

| | | | |
|---|---|---|---|
| 4,367,533 | 1/1983 | Wiener | 364/519 |
| 4,408,868 | 10/1983 | Thomas et al. | 355/14 R |
| 4,521,814 | 6/1985 | Ono et al. | 358/296 |
| 4,549,222 | 10/1985 | Fogaroli | 358/296 |
| 4,621,271 | 11/1986 | Brownstein | 346/76 PH |
| 4,623,242 | 11/1986 | Hayashi et al. | 355/14 R |
| 4,689,694 | 8/1987 | Yoshida | 358/296 |

OTHER PUBLICATIONS

T. Nishimura et al., Electrophotographic Color Printing Using Elliptical Laser Beam Scanning Method, Journal of Imaging Technology, vol. 12, No. 6, 1986, pp. 329–333.

N. Kawamura et al., Half-Tone Reproduction on Digital Color Printers Based on Electrophotography, Electrophotography 24(3), pp. 2–11 (1985).

Primary Examiner—E. A. Goldberg
Assistant Examiner—Mark Reinhart
Attorney, Agent, or Firm—Norman Rushefsky

[57] ABSTRACT

A reproduction apparatus includes a plurality of recording elements, for exampl, LED's, arranged in a row along the length of the printhead. An image scanner scans an original document sheet to generate data signals related to the information on the sheet. In rasterizing the data for reproduction by the printhead upon a photoreceptor, means are provided for locating a pictorial portion on the document sheet which will require screening during the reproduction process. Image information comprising text and charts not in the area determined to include the pictorial information is reproduced at a resolution of $N \times M$ dots per square inch. Image information including text, etc., in the area determined to include the pictorial information is reproduced at $N \times (L \times M)$ dots per square inch. The apparatus also includes means for providing additional emissions of the light emitting diodes, in response to photoreceptor travel, for correcting for nonuniformities in emissions of the LED's. Respective strobe pulses for enabling the LED's are selected in accordance with the type of exposure.

13 Claims, 7 Drawing Sheets

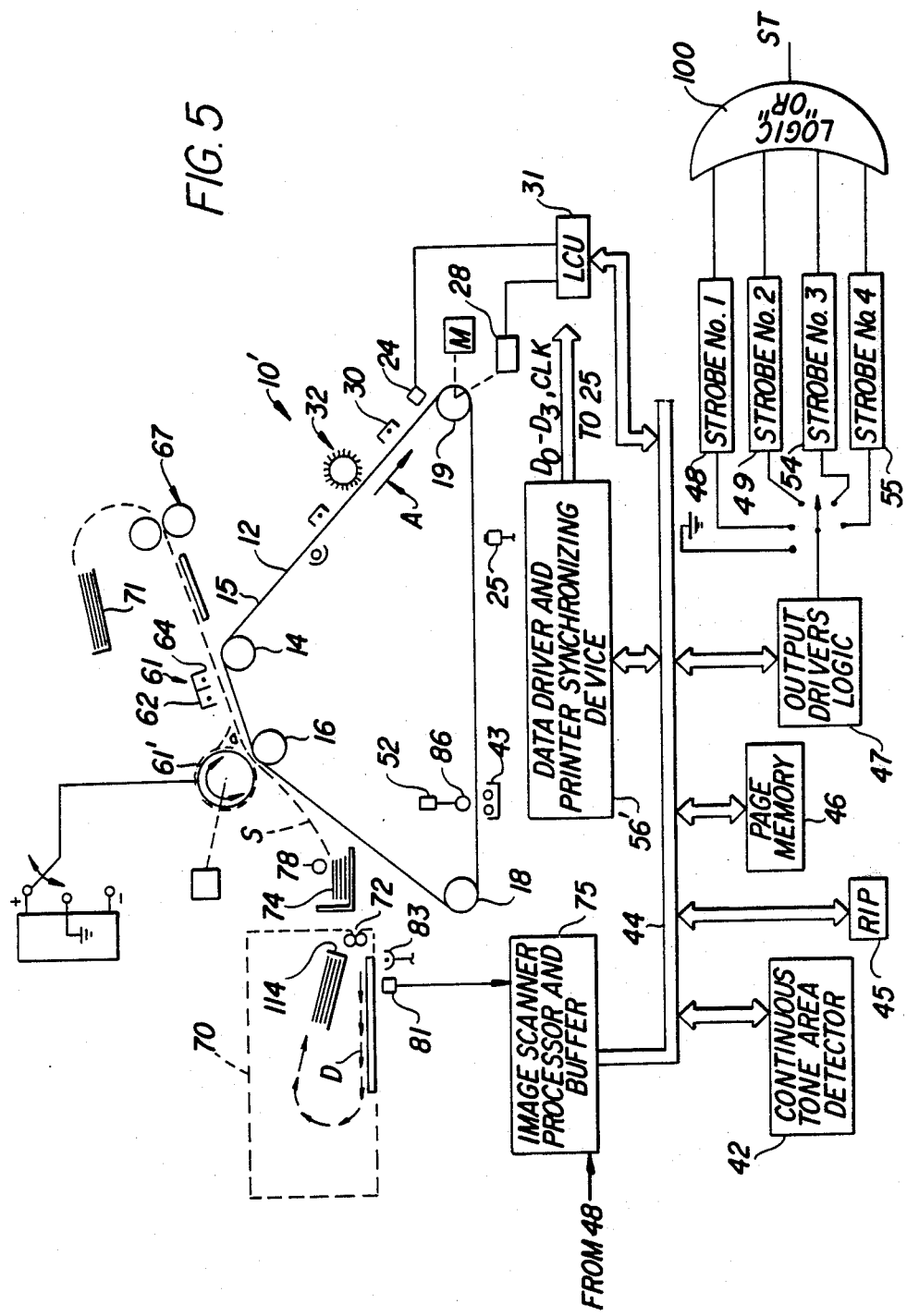

OPTICAL RECORDER WITH PLURAL RESOLUTION RECORDING

CROSS REFERENCE TO RELATED APPLICATIONS

This application is related to U.S. application Ser. No. 140,193, filed on even date herewith in the name of the same inventor and entitled "Nonimpact Printer With Nonuniformity Correction."

BACKGROUND OF THE INVENTION

1. Field of the Invention

The present invention relates to reproduction apparatus comprising non-impact printing apparatus for recording on a moving photoreceptor and a printhead for use therewith.

2. Brief Description of the Prior Art

In the prior art as exemplified by U.S. Pat. No. 4,521,814 printing apparatus is described which comprises a pair of individually addressable and energizable point-like radiation sources, such as lasers, arranged for exposing points upon a photoreceptor during movement thereof relative to the radiation sources. Driver circuits are provided for simultaneously energizing the radiation sources responsive to respective data bit input signals applied to the driver circuits during an information line period. One of the radiation sources is adapted to expose the photoreceptor with a plurality of relatively small pixels for reproduction of graphic information. The other radiation source is adapted to expose the photoreceptor with a plurality of relatively larger pixels for reproduction of text and drawing information. With such a scheme, there is thus provided an apparatus which is adapted to provide additional pixels over an area used for reproducing the graphic or pictorial information with increased grey scales reproduction. However, such apparatus adds complexity in requiring the need for separate printheads. It is an object of the invention to provide an improved apparatus for reproducing text and pictorials that overcomes the deficiencies of the prior art.

SUMMARY OF THE INVENTION

The above object and others which will become apparent in reading the specification below are realized by an apparatus for reproducing images including line type information and pictorial information to be reproduced in a screen pattern, the apparatus comprising:

a recording head having a plural number N of point-like recording elements per inch extending as a row along a line, the recording head emitting a line of dot recording signals in response to data signals;

an image receptor means having an area for recording emissions from the recording head on a line by line basis for reproducing the images;

means for moving the receptor means past the recording head;

means for determining areas of the image representing pictorial areas to be screened;

control means providing data signals to the printhead for exposing the line type areas with a resolution of N×M dots per square inch and providing data signals to the printhead for exposing the pictorial areas with a resolution of N×(L×M) dots per square inch; N, M and L being numbers greater than one and (L×M) being greater than N.

BRIEF DESCRIPTION OF THE DRAWINGS

FIG. 5 is a schematic of a second embodiment of printing apparatus made in accordance with the invention;

DESCRIPTION OF THE PREFERRED APPARATUS

The apparatus of the preferred embodiment will be described in accordance with an electrophotographic recording medium. The invention, however, is not limited to apparatus for creating images on such a medium, as other media such as photographic film, thermal sensitive, etc., may also be used with the invention.

DETAILED DESCRIPTION OF THE PREFERRED EMBODIMENTS

Because electrophotographic reproduction apparatus are well known, the present description will be directed in particular to elements forming part of, or cooperating more directly with, the present invention. Apparatus not specifically shown or described herein are selectable from those known in the prior art.

Figure 1:
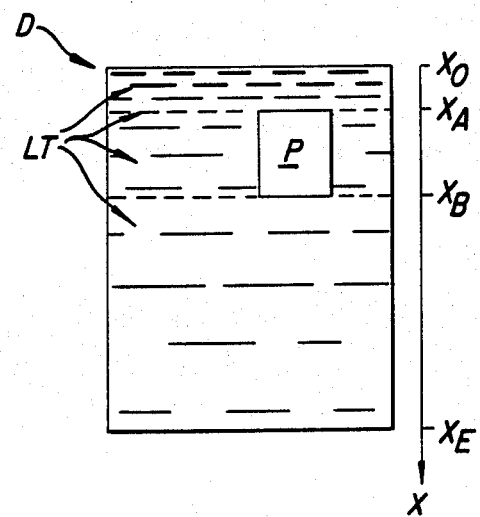
FIG. 1 is an illustration of an original document sheet to be reproduced by the apparatus of the invention.

With reference to FIG. 1, a typical original document sheet D to be reproduced by the apparatus of the invention includes a continuous tone pictorial portion "P" that is surrounded by printed line type information "LT."

Figure 2:
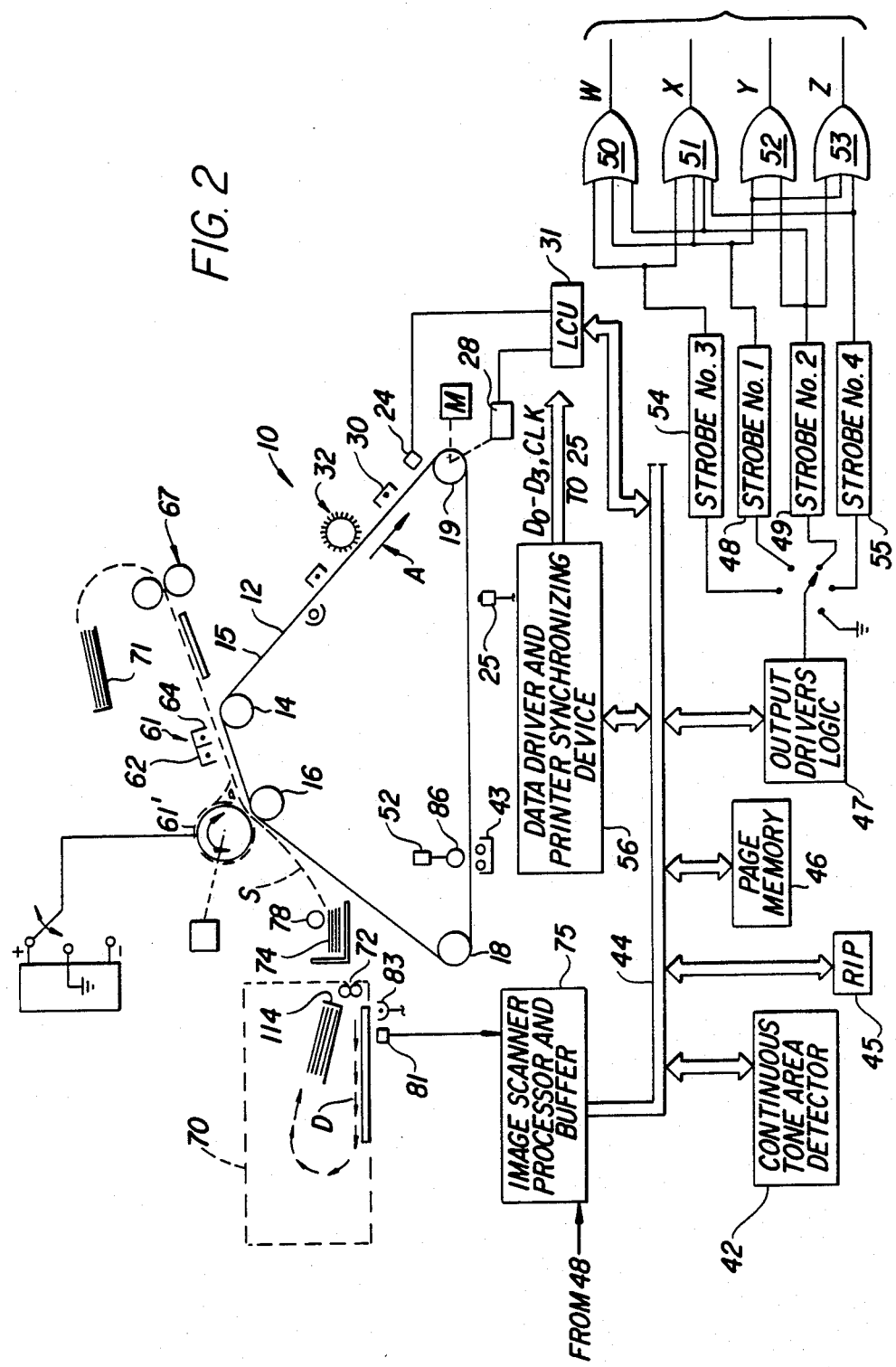
FIG. 2 is a schematic of a printing apparatus made in accordance with the invention.

With reference now to FIG. 2, an electrophotographic reproduction apparatus 10 includes a recording medium or photoreceptor such as a photoconductive web 12 or other photosensitive medium that is trained about four transport rollers 14, 16, 18 and 19, thereby forming an endless or continuous web. Roller 19 is coupled to a driver motor M in a conventional manner. Motor M is connected to a source of potential when a switch (not shown) is closed by a logic and control unit (LCU) 31. When the switch is closed, the roller 19 is driven by the motor M and moves the web 12 in a clockwise direction as indicated by arrow A. This movement causes successive image areas or image frames of the web 12 to sequentially pass a series of electrophotographic work stations of the reproduction apparatus.

For the purposes of the instant exposure, several work stations are shown along the web's path. These stations will be briefly described.

First, a charging station 30 is provided at which the photoconductive surface 15 of the web 12 is sensitized by applying to such surface a uniform electrostatic primary charge of a predetermined voltage. The output of the charger may be controlled by a grid connected to a programmable power supply (not shown). The supply is, in turn, controlled by the LCU 31 to adjust the voltage level Vo applied onto the surface 15 by the charger 30.

At an exposure station an electrostatic image is formed by modulating the primary charge on an image area of the photoconductive surface with selective energization of point-like radiation sources in accordance with signals provided by a data source to be described. The point-like radiation sources are supported in a printhead 25 also to be described in more detail below.

A development station 43 includes developer which may consist of iron carrier particles and electroscopic toner particles with an electrostatic charge opposite to that of the latent electrostatic image. Developer is brushed over the photoconductive surface of the web 12 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 61 shown with a pair of corona chargers 62, 64 at which the toner image on web 12 is transferred in register to a copy sheet S; and a cleaning station 32, at which the photoconductive surface of the web 12 is cleaned of any residual toner particles remaining after the toner images have been transferred. After the transfer of the unfixed toner images to a copy sheet S, such sheet is transported to a heated pressure roller fuser 67 where the image is fixed to the copy sheet S and the sheet is then transported to a tray 71. Suitable means such as a transfer drum 61' may be provided for duplex operation in accordance with known techniques.

As shown in FIG. 1, a copy sheet S is fed from a supply 74 by driver roller 78, which then urges the sheet to move forward onto the web 12 in alignment with a toner image.

To coordinate operation of the various work stations with movement of the image areas on the web 12 past these stations, the web has a plurality of indicia such as perforations along one of its edges. These perforations generally are spaced equidistantly along the edge of the web 12. At a fixed location along the path of web movement, there is provided suitable encoding means 24 for sensing web perforations. This sensing produces input signals into the LCU 31 which has a digital computer, preferably one or more microprocessors. The LCU has a stored program responsive to the input signals for sequentially actuating, then de-actuating, the work stations as well as for controlling the operation of many other machine functions. Additional encoding means 28 may be provided as known in the art for providing more precise timing signals for control of the various functions of the apparatus 10 as will be described below.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor(s).

Figure 3:
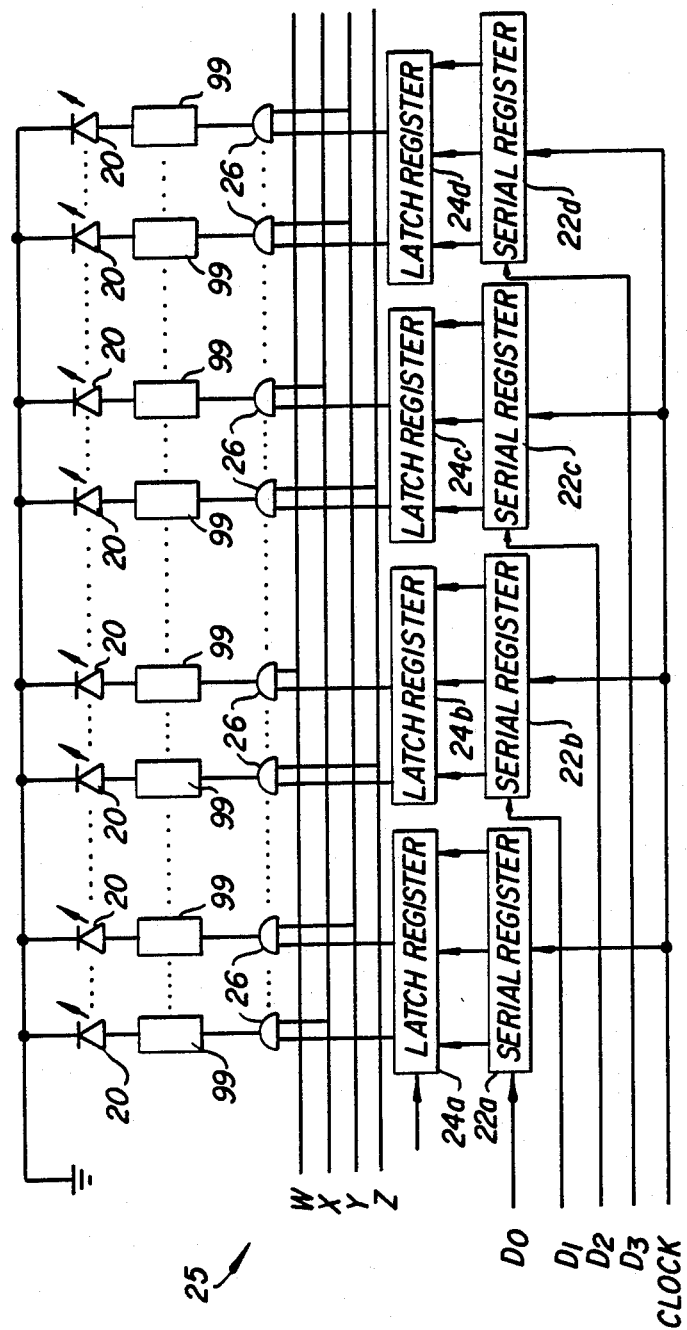
FIG. 3 is a block diagram of circuitry used in forming a printhead for use with the printing apparatus of FIG. 2.

With reference to both FIGS. 2 and 3, the printhead 25, as noted, is provided with a multiplicity of energizable point-like radiation sources 20, preferably light-emitting diodes (LED's). Optical means (not shown) may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means, a row of emitters will be imaged on a respective transverse line on the recording medium.

With reference to FIG. 3, the printhead 25 comprises a suitable stationary support with a series of LED chip arrays mounted thereon. As is well known, each of the LED chip arrays includes, for example, 128 LED's arranged in a single row. These chips are also arranged end-to-end in a row and where thirty-eight LED chip arrays are so arranged, the printhead will extend across the width of the web 12 and include 4864 LED's arranged in a single row. To each side of this row of LED's there may be provided, for example, thirty-eight identical driver chips. Each of these driver chips include circuitry for addressing the logic associated with each of 64 LED's to control whether or not each of the LED's should be energized as well as current driver circuitry 99 to control the level of current to each of the LED's controlled by that driver chip 40. Two driver chips are thus associated with each LED chip array. Each of the two driver chips will be coupled for driving of alternate LED's, i.e., one of the driver chips will drive the even numbered LED's and the other driver chip will drive the odd numbered LED's in a particular LED chip array. Thus, one driver chip will drive the 64 odd numbered LED's of the 128 LED's in the array and the other driver chip will drive the 64 even numbered LED's of these 128 LED's. Only some of the even numbered LED's are illustrated in FIG. 3, it being understood that many more LED's are present.

As may be noted in FIG. 2, the original document sheet D forms a part of a multisheet document supported in a recirculating feeder tray 70. A vacuum drive roller (not shown) under control of the LCU feeds the document D face down through metering rollers 72 which are adapted to feed the document D past an image scanning head 81 formed of say a conventional CCD array and provide signals to a conventional image scanner processor and buffer indicative of the movement of the sheet. A lamp 83 provides a narrow line of illumination, upon the document D and reflections thereof off the document D are sensed by the image scanning array to provide signals indicative of density information thereon. This output of the image scanner array is fed to the image scanner processor and buffer 75. In order to determine which areas of the original fall within the continuous tone area "P", the output of the data from the image scanner processor and buffer 75 is introduced into a continuous tone area detector 42 to identify the boundaries of the continuous tone information. Circuitry for performing this function are well known, for example, see U.S. Pat. No. 4,194,221 to Stoffel, issued Mar. 18, 1980. In other cases, the boundary defining the continuous tone picture can be inputted via a digitizing tablet or the image information and boundary data may be provided via a host computer, etc. The data representing the scanned image on document D along with data representing the boundaries of the continuous tone area P are fed over bus 44 to a raster image processor (RIP) 45. The RIP 45 processes this data and formats same in accordance with well known techniques and the output thereof is fed over to a page memory 46 wherein a page of rasterized data to be printed is stored. The output image between the boundaries of $X_A$ and $X_B$ which contains the pictorial information will be processed to produce images at 400×800 addressable points per square inch of output information. In areas other than between $X_A$ and $X_B$, the output image is processed at 400×400 addressable points per square inch. The data information identifying the location of the pictorial information is stored in the LCU. This information may simply comprise the coordinates (see FIG. 1) $X_A$ and $X_B$ referenced relative to a leading edge $X_O$ of document D.

In response to pulses from encoders 24 and 28 identifying a new image frame on a photosensitive web, the LCU provides an output signal to the Page Memory to remove one line of data. This data is fed to a conventional output device for formatting the data and synchronizing the operation thereof. This output device is illustrated by the data driver and printer synchronizing device 56. This data, indicated in FIG. 3 by lines $D_0$–$D_3$, is fed under clock control to an appropriate serial data shift register 22a, 22b, 22c and 22d (for the even numbered LED's) until 4864 bits of data, one for each of the LED's, is stored in the serial registers for the odd and even numbered LED's. Upon a signal from the LCU, the data (for the illustrated even numbered LED's) is shifted in parallel to latch registers 24a, 24b, 24c and 24d enabling the next line of data to be introduced into the serial shift registers. In response to an encoder pulse or other suitable pulse indicating the timing for firing the next line for printing of dots, the LCU causes the output drivers logic device 47 to enable a trigger circuit providing a time strobe signal. The output of the strobe is introduced to each of four logic OR gates 50–53. The output lines W, X, Y and Z of the logic OR gates are fed to one input of a logic AND gate 26 associated with each LED. The other input of AND gate 26 is provided with a data bit from the latch register representing whether or not a dot is to be printed at this time. Assuming a dot is to be printed, a respective LED is enabled for a time period predetermined by the strobe signal. As may be noted from FIG. 2, four possible strobe signals may be selected from the following trigger devices: strobe device #1(48), strobe device #2(49), strobe device #3(54) and strobe device #4(55). Strobe #1 has a duration, in this example, of 100 μ sec. and the strobe #2 a duration of 50 μ sec. While reproducing the portion of the document between $X_O$ and $X_A$, the strobe device #1 is used and is selected by logic device 47 in response to signals from the LCU. Adjacent LED's are spaced so as to provide 400 dots per inch (157 per cm). The encoder 28 provides pulses at the rate of 1/2400 per inch (0.01 mm) of travel of the web 12. For exposing the text data in the areas between $X_O$ to $X_A$ and $X_B$ to $X_E$, it is sufficient that for line type of information that the exposure be made on the basis of 400 lines per inch (157 per cm) and that encoder pulses in between be effectively ignored. For this exposure, strobe #1 is employed and exposure pixels of two consecutive pixels ($P_1$ and $P_2$) in the in-track direction of movement of web 12 are illustrated at FIG. 4(b). For the line type and pictorial information between $X_A$ and $X_B$, increased grey scale rendition is provided, particularly, to the pictorial information by exposing the photoconductor web on the basis of 800 lines per inch (315 per cm) in the in-track direction. To do this, the duration of each LED exposure in this area is reduced to 50 μ sec. with the use of strobe #2(49) which is activated for each 1/800 inches (0.032 mm) of web movement. Note that the additional number of exposures to the pictorial area is accompanied with a corresponding reduction in exposure time for each pixel. In FIG. 4, the pixels produced by three successive strobe signals are illustrated by $P_3$, $P_4$ and $P_5$. As LED's are known to be nonuniform light emitters, it is highly desirable to ensure proper rendition that correction be provided to exposures, particularly, in the area reproducing the pictorial information. To this end, additional strobe devices #3(54) and #4(55) are provided. Strobe device #3 provides a strobe signal of 10 μ sec. duration while strobe device #4 provides a strobe signal of 5 μ sec. Thus, for exposures in the area $X_A$ to $X_B$ correction may be provided of 5 μ sec., 10 μ sec., or 15 μ sec. (strobes #3 and #4 both being used) in addition to the nominal strobe value of 50 μ sec.

During manufacture of the printhead 25, each LED is tested to determine whether or not it needs correction in terms of requiring additional light output since similar LED's tend from LED to LED to emit variable amounts of light even though provided with identical driving currents. Those LED's requiring say 10% more "on-time" are attached to line Z which receives an input from strobe device #4. Those LED's requiring more "on-time" of say 20% are attached to line W which receives an input from strobe device #3. Those requiring more "on-time" of say 30% are attached to line X which receives an input from both strobe devices #3 and #4. An example of such additional exposure is shown schematically in FIG. 4(a) with correction pixel $P_6$ representing a 10 μs exposure and correction pixel $P_7$ a correction exposure of 5 μs (note the sizes of these are shown relatively larger to facilitate their viewing and that only one data pixel, $P_3$, is shown with its correction pixels). Those LED's requiring no correction exposure are attached to line Y which receives an input from none of the strobe devices used for correction exposures, but only strobe signals of strobe devices #1 and #2. Lines W, X, Y, and Z also each receive strobe signals of strobe devices #1 and #2. In operation, the output drivers logic device 47 only switches on strobe device #1 (48) for each 1/400 of an inch of web drive where the printing of line type data corresponding to document areas $X_O$ to $X_A$ and $X_B$ to $X_E$ (end of document) is to be made.

As encoder 28 tracks the web at each 1/2400 inches of movement the logic devices 47 switches to a null position where no strobe signal is provided at times $t_1$, $t_2$, $t_3$, $t_4$ and $t_5$ until at $t_6$ the next pixel $P_2$ is to be exposed (pixel $P_1$ having been exposed at time $t_0$). At time $t_6$ the output drivers logic device 47 once again switches to strobe device #1 to trigger a strobe signal of 100 μs duration over lines W, X, Y and Z. When the printhead 25 is exposing areas of the image frame on web 12 used to reproduce portions of document sheet D between coordinates $X_A$ to $X_B$ the output drivers logic device 47 triggers strobe device #2 at each 1/800 inches of photoconductor web travel, i.e. say at times $t_0$, $t_3$ and $t_6$ and at times $t_1$, $t_2$, $t_4$ and $t_5$ triggers strobe devices #3 and #4 used for correction. In the example of this apparatus, strobe device #1 is triggered at times $t_1$ and $t_4$ and strobe device #2 is triggered at times $t_2$ and $t_5$. In fact, the correction exposures are so overlapped with their associated image data exposure that no single low exposure isolated dot will exist on the printed page. Data signals $D_0$–$D_3$ must be output at a rate suitable for providing a new data bit at the AND gate 26 for each 1/800 of web travel (at least while operating on reproducing of areas between $X_A$ to $X_B$); i.e., for strobe times $t_0$, $t_3$ and $t_6$. But note that the availability of this extra data exposure period for pictorial reproduction is usable for increasing grey scale rendition on a printhead that is basically configured for bilevel reproduction of grey scale information. In the apparatus described above, it will be noted that text in the area within the coordinates $X_A$ to $X_B$ is also reproduced at 400×800 resolution to simplify the circuitry to the printhead.

In the printhead 25, multiple strobe lines W, X, Y and Z are required with separate connection of each LED to a respective one of the four strobe lines. This adds some manufacturing cost to producing such a printhead. A compromise in cost versus quality may be made based on the assumption that the group of 64 odd numbered LED's in any LED array will have similar characteristics and will have current driven therethrough from a single driver chip that is adapted to drive all these 64 LED's. A similar statement may be made for the even numbered LED's in that array. Thus, it is contemplated in my invention that an integrated circuit driver chip incorporating the serial registers, latch register and current driver for a group of LED's be connected to one of the strobe lines W, X, Y or Z based on say the average light output of the 64 LED's under control of that driver chip. Thus, all 64 LED's in that group will receive the appropriate same correction assuming, of course, that only those LED's that are activated to expose pictorial data receive such correction.

Figure 6:
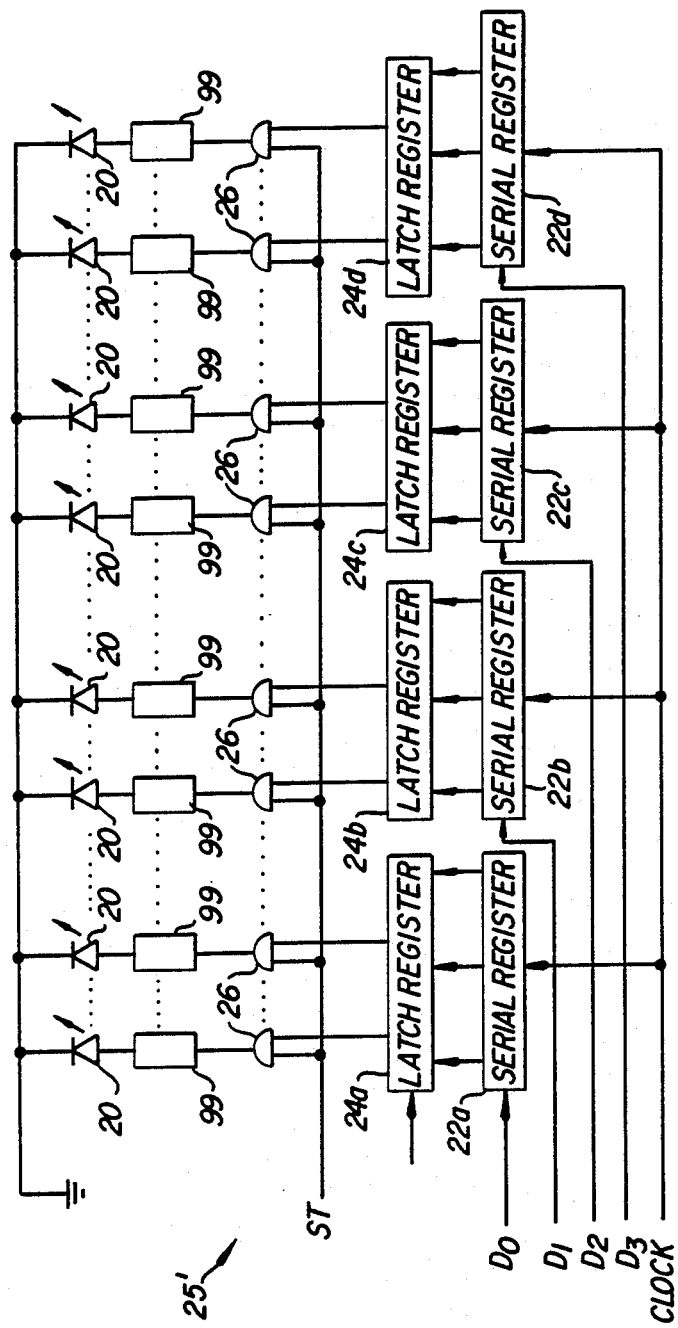
FIG. 6 is a block diagram of circuitry used in forming a printhead for use with the printing apparatus of FIG. 5.
Figure 7:
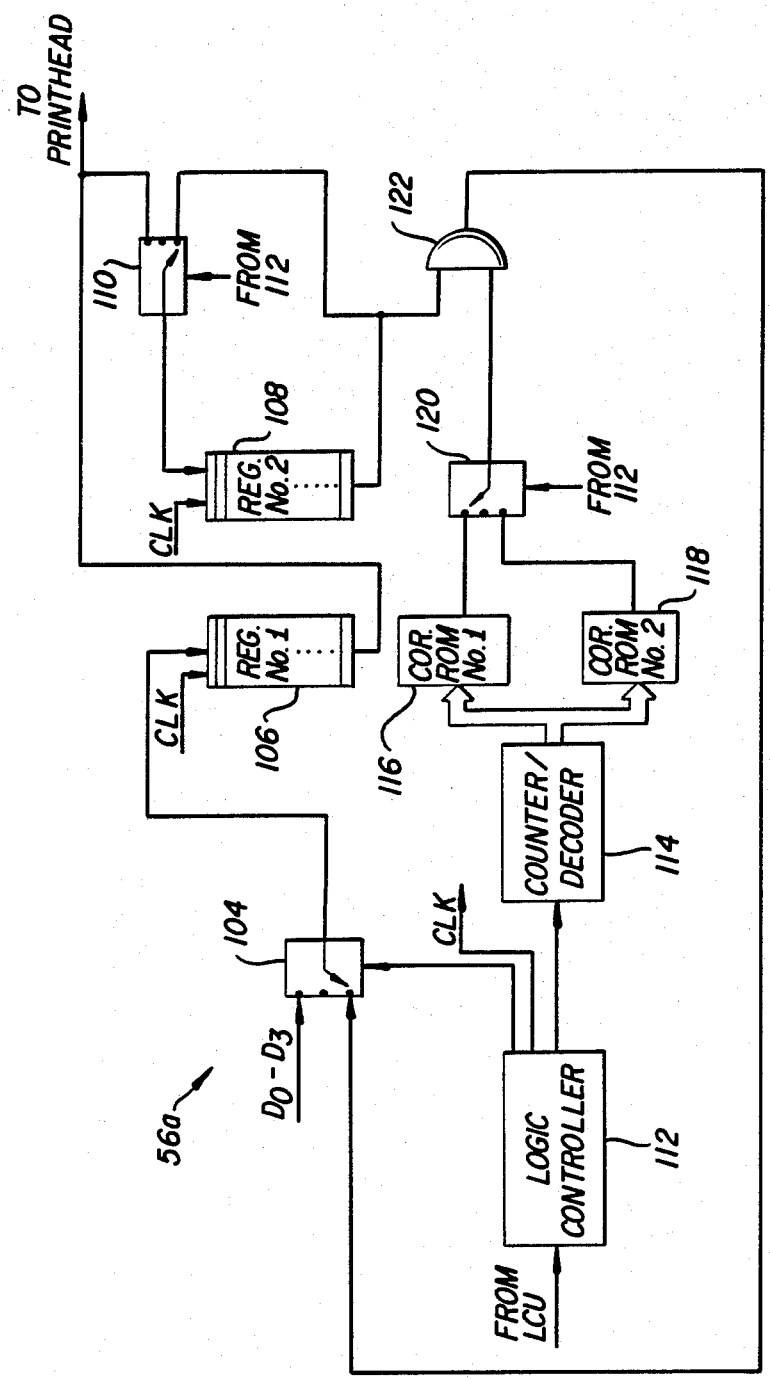
FIG. 7 is a block diagram of a circuit interface for driving data to the printhead of FIG. 6.

With reference to the embodiment of FIGS. 5–7, a modified print apparatus is described wherein the same numerals refer to similar parts described for the apparatus embodiment in FIGS. 2–3. In the apparatus of FIGS. 5–7, a still further simplification of printhead structure is achieved using a single strobe line ST. Operation of the apparatus 10' is similar to that described for the embodiment of FIGS. 2–3 except that the outputs of the strobe devices #3 and #4 and the strobe devices #1 and #2 are subject to a logic "OR" operation by ♭OR" device 100 to cause all strobe signals to be outputted on line ST. With reference to FIG. 7, a portion 56a of the data driver and printer synchronizing device 56' is shown. The rasterized print data for a line of dots to be printed is provided to one input of a solid state switch 104. Actually, since data for line portions $D_0$–$D_3$ are handled simultaneously, the devices described in FIG. 7 are actually multistage devices with single stages being illustrated for facilitating description thereof. In the example where all the data for the line is text or linetype data (data between $X_O$–$X_A$ and $X_B$–$X_E$), the switch 104 transfers the data under a clock control into a shift register #1 (106). At an appropriate time, this data can then be shifted out to the printhead to appropriate shift registers 22a, 22b, 22c and 22d (FIG. 6) as well as to those registers (not shown) used to drive the odd numbered LED's for printing in accordance with the process described above at times $t_0$, $t_6$, etc. The strobe signal on line ST for this is provided by strobe device #1 (48). For reproducing areas such as $X_A$ through $X_B$ which include at least some pictorial information, the data $D_0$–$D_3$ for pixels or dot at times $t_0$, $t_3$, $t_6$, etc. is fed via switch 104 to shift register #1 and at an appropriate time output to the printhead. However, solid state switch 110 is adjusted by a signal from logic controller 112 and also inputs this data into shift register #2 (108). The data in shift register #2 is then serially output and "ANDed" at AND gate 122 with a bit from a correction ROM (read only memory) which will now be described. Correction ROM's #1 (116) and #2 (118) are provided to store data concerning the characteristics of each LED. Thus for each LED, two bits of data are stored; i.e., 1. Does that LED require a 10 μs correction?(yes or no) and 2. Does that LED require a 5 μs correction? (yes or no). While two separate ROM3 s are described for illustrative purposes, a single ROM storing two bits of data for each LED is also contemplated. A switch 120 operated under signal control by logic control 112 selects the output of the ROM being interrogated. For example, for obtaining the correction data for exposure times $t_1$, $t_4$, etc., correction ROM 116 is interrogated and has its output ANDed with the data $D_0$–$D_3$. The resulting "data" is fed to switch 104 which is switched to select same under control of logic controller 112. The data is then clocked into shift register #1 (106) for subsequent shifting to the printhead as if it was actual data to be printed. The output from correction ROM #1 is selected to correspond to the LED to which the data for that particular LED is assigned by its position in shift register #2. The selection of correction data from the correction ROM's are provided by a counter/decoder 114 which keeps count under pulse control of logic controller 112 as to which LED's correction data is to be fetched. The counter/decoder uses the count as the address for fetching the correction data from the correction ROM's. The combining of the pictorial data to be printed at either $t_0$, $t_3$, or $t_6$, etc. with the correction data from correction ROM #1 determines the LED's which are to receive exposure of 10 μs. Thus, only those LED's that are to be activated for the $t_0$, $t_3$, or $t_6$, etc. exposures are allowed to be enabled to be corrected during respective exposure periods $t_1$, $t_4$, etc.

In the process of outputting the correction data to be printed at $t_1$, $t_4$, etc., the original image data is also retained by, for example, having switch 110 connect the output of the shift register back into the input for storing same again. Other techniques and devices for retaining the data while outputting same are also contemplated. Then the same operation is repeated for the data in shift register #2 to subject same to the AND operation with the lower order correction bits from correction ROM #2 for obtaining correction "data" that is stored in shift register #1 (106) via switch 104. This correction "data" is sent to the printhead 25' and represents those LED's that were activated for a prior real data exposure such as at times $t_0$, $t_3$, or $t_6$, etc. and requiring a 5 μs correction exposure. It should be understood that the appropriate strobe signal ST will be selected by the LCU 31 and drive the output drivers logic 47 to select which one of the strobe signals to enable at the appropriate time. While separate trigger devices are shown to generate the different strobe signals, it will be appreciated that appropriate strobe signals may be provided by a single device that is say software controlled to output pulses of required duration.

Figure 4A:
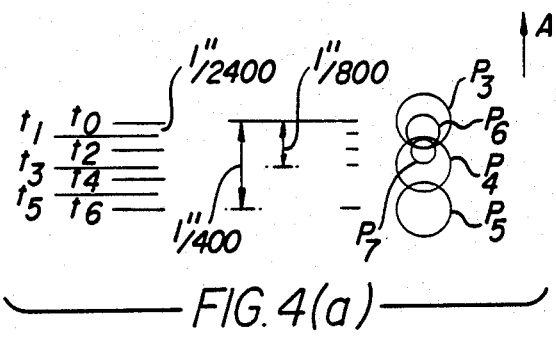
FIG. 4a, 4b, and 4c is an illustration of a plurality of exposure points made with apparatus of the invention.
Figure 4B:
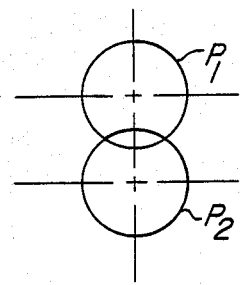

In the interface circuit described in FIG. 7, it will be noted that for a real data pixel requiring correction that such correction pixels will follow after the data pixel, i.e., in FIG. 4(a) correction pixels $P_6$, $P_7$ follow real data pixel $P_3$. In the embodiment of FIGS. 1–3, one can provide for rearrangement of the order of forming the data pixels and the correction pixels by, for example, triggering the strobe device #3 first, then the strobe device #2 and lastly, the strobe device #4. This has the advantage of providing a more uniform or more symmetric pixel shape, compare the corrected pixel in FIG. 4(c) comprised of correction pixels $P'_6$ and $P'_7$ and data pixel $P'_3$ with that formed in FIG. 4(a) by pixels $P_6$, $P_7$ and $P_3$. It is also possible that for data pixels receiving only strobe device #4 that the correction $P_7$ pixel may not overlie the data pixel $P_3$ where the spacing between firing times $t_2$ and $t_0$ is somewhat greater than what is needed to permit these pixels to overlie.

Figure 4C:
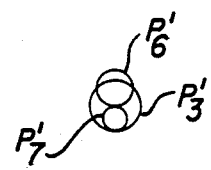
Figure 8:
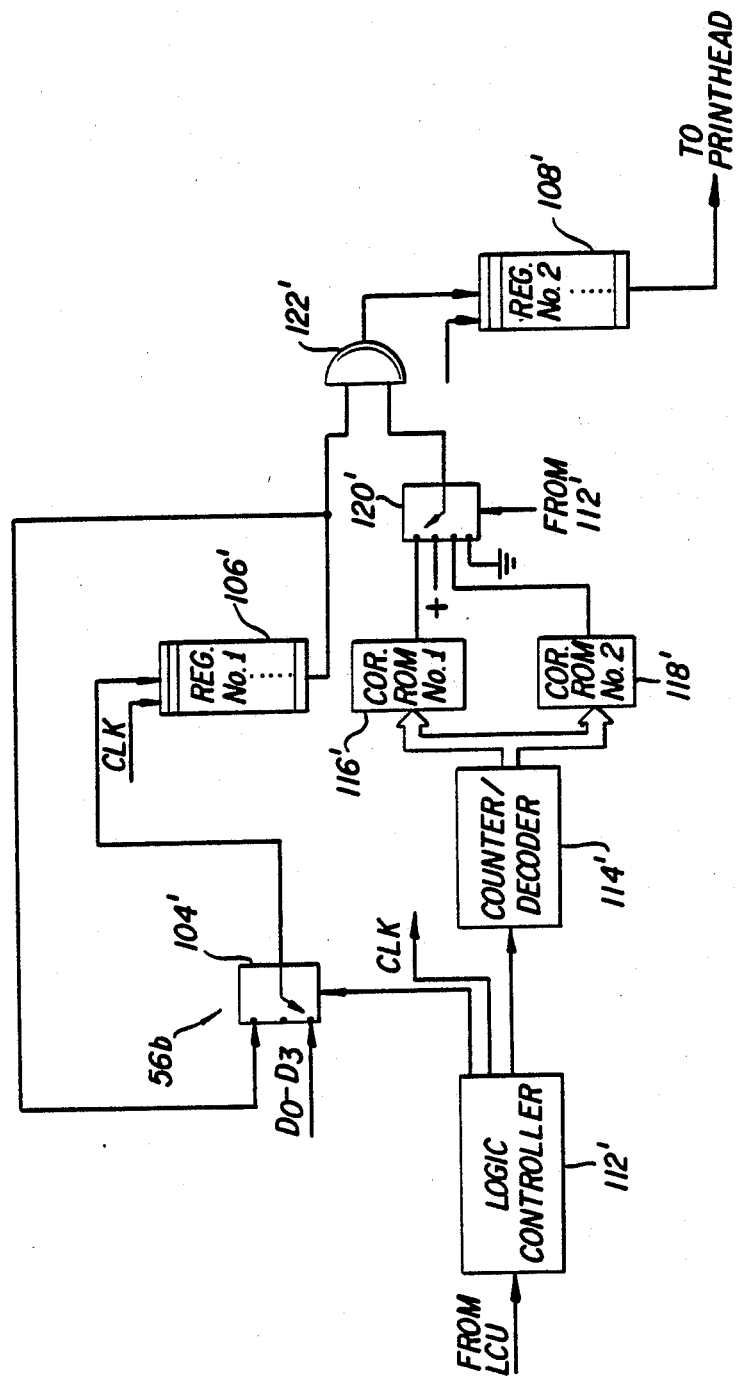
FIG. 8 is a block diagram of another embodiment of a circuit interface for driving data to the printhead of FIG. 6.

The interface circuit shown in FIG. 8 may be used with the apparatus shown in FIGS. 5 and 6 in lieu of the interface shown in FIG. 7 to provide for more symmetrical shaped corrected pixels. The various parts or devices used in the FIG. 8 embodiment are similar with those shown in FIG. 7 and their numerical identification is provided with a (') to distinguish them from the devices or parts illustrated in FIG. 7. For reproduction of line-type or text, etc., (where no correction may be needed) the data ($D_0$–$D_3$) is fed by switch 104' to shift register #1 (106') and then output through AND gate 122' to the printhead 25' (FIG. 6) via shift register #2 (108'). Switch 120', which is the other input to AND gate 122', is switched to a source of logic high potential indicated by (+) to allow all data from register 106' to pass through the gate. In the case of reproducing areas containing some pictorial information where correction is advantageous, the real data input on lines $D_0$–$D_3$ is fed by switch 104' to register 106'. This data is then output from the shift register to one input of AND gate 122'. The second input of AND gate 122' is receiving correction data from correction ROM #1 (116') via switch 120'. Thus, only those LED's that will be enabled for real data will be provided with a correction pixel from correction ROM #1. This correction data is stored in shift register #2 (108') and then output to the printhead shift registers 22a, 22b, 22c and 22d of FIG. 6 at the appropriate time for printing using the strobe device #3 which provides a 10 μs correction pulse forming $P'_6$ in FIG. 4(c) at time $t_0$. The real data is also recirculated back to register 106' via switch 104' for use in printing the data pixels $P_3'$ with strobe device #2 at time $t_1$. For this operation, switch 120' switches to receive an input from its logic high (+) terminal to input this to one input of AND gate 122'. The real data is output from register 106' and input to the other input of AND gate 122'. The real data is thus output to shift register 108' and to the printhead for printing the data pixels $P_3'$ using a strobe signal of 50 μs duration. The real data is also again recirculated back through switch 104' to register 106' for printing of the next set of correction pixels using correction ROM #2 (118'). The real data is serially input into one input of AND gate 122' and "ANDed" with correction data from correction ROM #2 which is input through switch 120' to the second input of AND gate 122'. This correction data is then output through register 108' to the printhead registers 22a, 22b, 22c, and 22d, etc. of printhead 25' (FIG. 6) for printing using strobe device #4 which has a pulse duration of 5 μs. Thus, only those LED's that will be enabled for real data will receive suitable correction (if required in accordance with correction characteristics stored in ROM #2). Again, the correction data is stored in register 108' and output to the printhead. The logic controller 112', counter decoder 114' function as described previously to synchronize the various flows of data and switching in accordance with the requirements described herein. With this circuit, more symmetric corrected pixels are formed as illustrated in FIG. 4C.

Thus, with apparatus of the invention, a document having only text will be exposed on the basis of 400×400 dots per square inch. Where a document is of mixed text and pictorial information required to be screened, the portions of the text not determined to be in the area of the pictorial information are reproduced at 400×400 dots per square inch, while other portions of text and more importantly the pictorial information are exposed on the basis of 400×800 dots per square inch providing improved grey scale rendition. Since the encoder tracks the photoconductive web at each 1/2400 of an inch of movement, each of the correction pulses may be responsive to a separate encoder pulse. As may be seen in FIGS. 4a, a series of pixels used in reproducing the pictorial portion and representing output of a single LED while the web moves in the direction "A" has nominal exposure pixels ($P_3$, $P_4$, $P_5$) on a 400×800 per square inch basis with correction pixels ($P_6$, $P_7$) interspersed between the exposure pixels.

While resolution herein is described in terms of the separate pixel exposures of each dot formed on the photoreceptor, it should be appreciated that in forming reproductions of the pictorial portion(s) requiring screening that clusters of such dots or pixels may be used to form larger dots or super pixels such as pixels of the so-called fattening type.

While the invention has been illustrated with regard to reproduction of line-type information such as text with resolution at 400×400 dots per square inch and pictorial information at 400×800 dots per square inch the invention contemplates an apparatus having a recording head with a plural number N of point-like recording elements per inch exemplified by the N=400 dots per inch printhead described herein, and a control for exposing line type areas with a resolution of N×M dots per square inch exemplified by M=400 in the illustrative embodiment and exposing pictorial areas with a resolution of N×(L×M) dots per square inch, exemplified by L=2. Note that the product of L times M, (L×M), is greater than N.

Thus, there has been disclosed improved printer apparatus providing suitable levels of grey scale to appropriately reproduce a pictorial portion of a reproduction while also providing for suitable text reproduction on a relatively inexpensive printhead that would normally not be able to provide as good a grey scale rendition. The use of a lower resolution for text reproduction increases productivity in ability to handle data and may extend the life of the LED printhead since such devices tend to age in accordance with the number of actuations. The amount of memory for storing information required for printing is also reduced. The specific exposure times and resolution dimensions identified numerically are provided as exemplary and, of course, may be optimized for the appropriate printhead.

While the invention has been illustrated in connection with a electrophotographic apparatus, other non-impact dot matrix printers such as thermal, electrographic, etc., may also make use of the invention described herein.

The encoder means may be of the type described herein, wherein each line of printing is "tracked" relative to actual photoconductor movement or wherein an encoder signal is "tracked" at the beginning of each frame and pulses artificially created for each line in accordance with approximate photoconductor movement.

The invention has been described in detail with particular reference to preferred embodiments thereof, but it will be understood that variations and modifications can be effected within the spirit and scope of the invention.

I claim:

1. An apparatus for reproducing images comprising line type and pictorial information to be reproduced, the apparatus comprising:
    a recording head having a plural number N of point-like recording elements per inch extending so as to record along a line, the recording head emitting a line of dot recording emissions in response to data signals;
    an image receptor means having an area for recording emissions from the recording head on a line by line basis for reproducing the images;
    means for moving the image receptor means relative to the recording head;
    means for determining areas of the image representing pictorial areas to be reproduced;
    control means providing data signals to the recording head for exposing M lines per inch in the line type areas with a resolution of N×M dots per square inch and providing data signals to the printhead for exposing L×M lines per inch in the pictorial areas with a higher resolution of N×(L×M) dots per square inch; N, M and L being numbers greater than one and (L×M) being greater than N.

2. The apparatus of claim 1 and wherein
    the control means includes a plurality of strobe lines provided on the recording head;
    means logically coupling each of the recording elements to a respective strobe line the number of strobe lines being fewer than the number of recording elements on the recording head;
    means for providing timing signals related to the relative movement of the image receptor for triggering strobe signals on said strobe lines; and
    the control means providing on at least some of said lines, in response to separate timing signals, strobe signals for recording data signals and other strobe signals for providing correction, the strobe signals providing correction actuating certain of said recording elements to provide additional emissions to make the emissions from said recording head more uniform.

3. The apparatus of claim 1 and wherein the recording elements are light emitting diodes.

4. The apparatus of claim 2 and wherein the recording elements are light emitting diodes.

5. The apparatus of claim 4 and wherein the image receptor is a photoconductive member.

6. The apparatus of claim 1 and wherein the control means includes a single strobe line provided on the printhead;
    means logically coupling each of the recording elements to the strobe line;
    means for providing timing signals related to the relative movement of the image receptor for triggering strobe signals on said strobe line;
    memory means for storing correction data for the recording elements;
    means providing one type of strobe signal for activating the recording elements for recording line-type information, a different type of strobe signal for activating the recording elements for recording information including pictorial information, and a third different type of strobe signal for activating the recording elements for correcting for nonuniformities in output during recording of the pictorial information;
    register means for storing for printing data representing only line-type data, data representing at least some pictorial data or data representing only correction data; and
    control means, in response to separate timing signals, for selecting one of the types of strobe signals in accordance with the data stored in the register means for activating the recording elements for recording of the respective data.

7. The apparatus of claim 6 and wherein the recording elements are light emitting diodes.

8. The apparatus of claim 7 and wherein the image receptor is a photoconductive member.

9. The apparatus of claim 1 and further comprising wherein the means for determining areas of the image representing pictorial areas determines such areas on a full line-by-line basis even if a portion of a line includes line-type information so that the control means provides data signals containing mixtures of pictorial and line-type information and prints same with the higher resolution.

10. The apparatus of claim 9 and wherein the control means further includes a strobe line;
    means logically coupling each of the recording elements to the strobe line;
    means for providing timing signals related to the relative movement of the image receptor for triggering strobe signals on said line; and
    means providing one type of strobe signal for activating the recording elements for recording line-type information and a different type of strobe signal for activating the recording elements for recording information including pictorial information.

11. The apparatus of claim 10 and wherein the means providing strobe signals generates a strobe signal for recording line-type information for any one recording element that is, for each line of such information to be recorded, a pulse of a first fixed duration and generates a strobe signal for recording information including pictorial information for said one recording element that is, for each line of such information to be recorded, a pulse of a second fixed duration shorter than said first fixed duration.

12. The apparatus of claim 1 and wherein the control means further includes a strobe line;
    means logically coupling each of the recording elements to the strobe line;
    means for providing timing signals related to the relative movement of the image receptor for triggering strobe signals on said line; and
    means providing one type of strobe signal for activating the recording elements for recording line-type information and a different type of strobe signal for activating the recording elements for recording information including pictorial information.

13. The apparatus of claim 11 and wherein the means providing strobe signals generates a strobe signal for recording line-type information for any one recording element that is for each line of such information to be recorded, a pulse of a first fixed duration and generates a strobe signal for recording information including pictorial information for said one recording element that is, for each line of such information to be recorded, a pulse of a second fixed duration shorter than said first fixed duration.

* * * * *